June 7, 1960  K. P. RYAN  2,939,679
TONGUE SUPPORTING JACK MECHANISM FOR TRAILER-TYPE VEHICLE
Filed Feb. 20, 1956  2 Sheets-Sheet 1
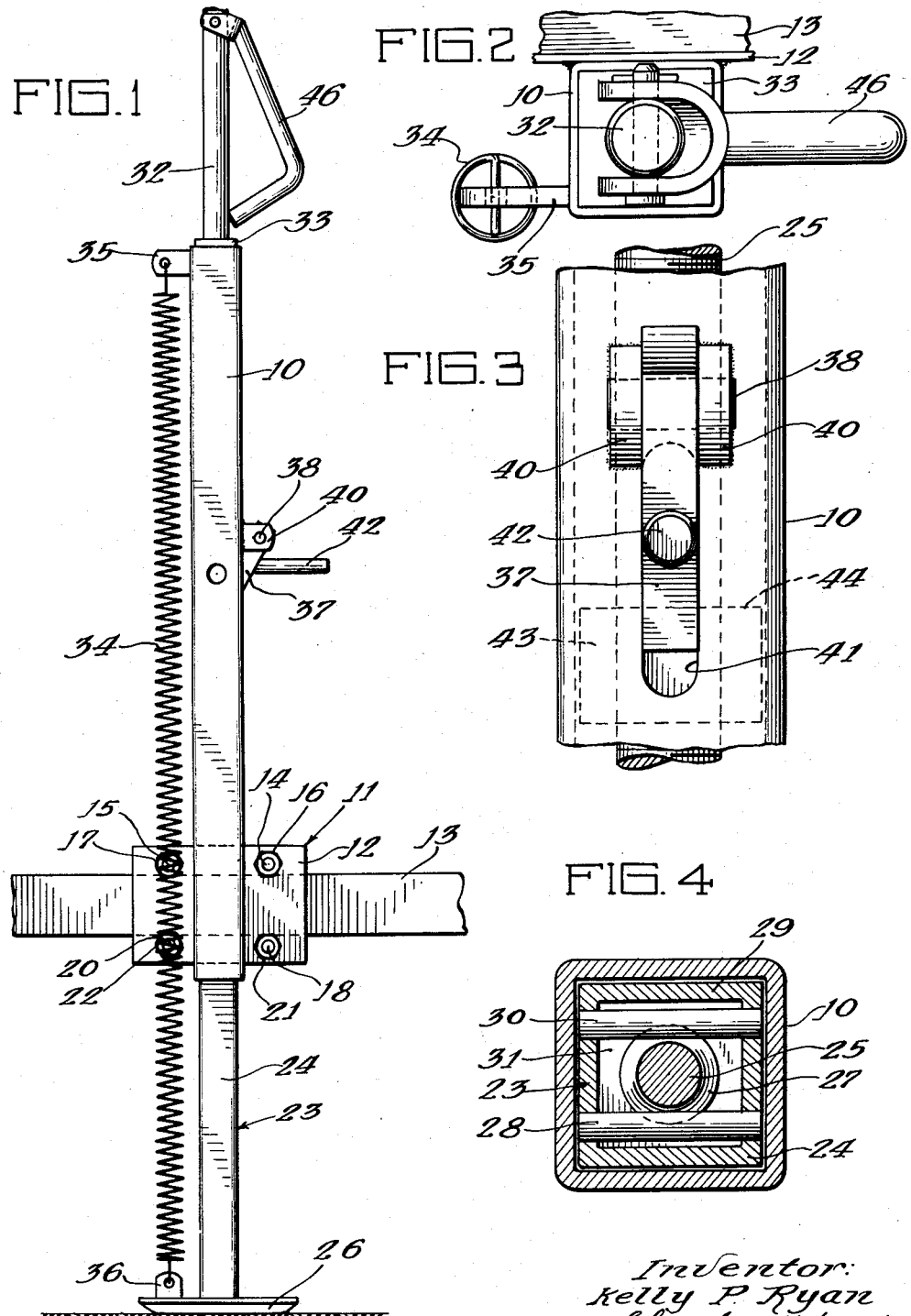
Inventor:
Kelly P. Ryan
By: Schroeder, Hofgren,
Brady & Wegner
Attorney

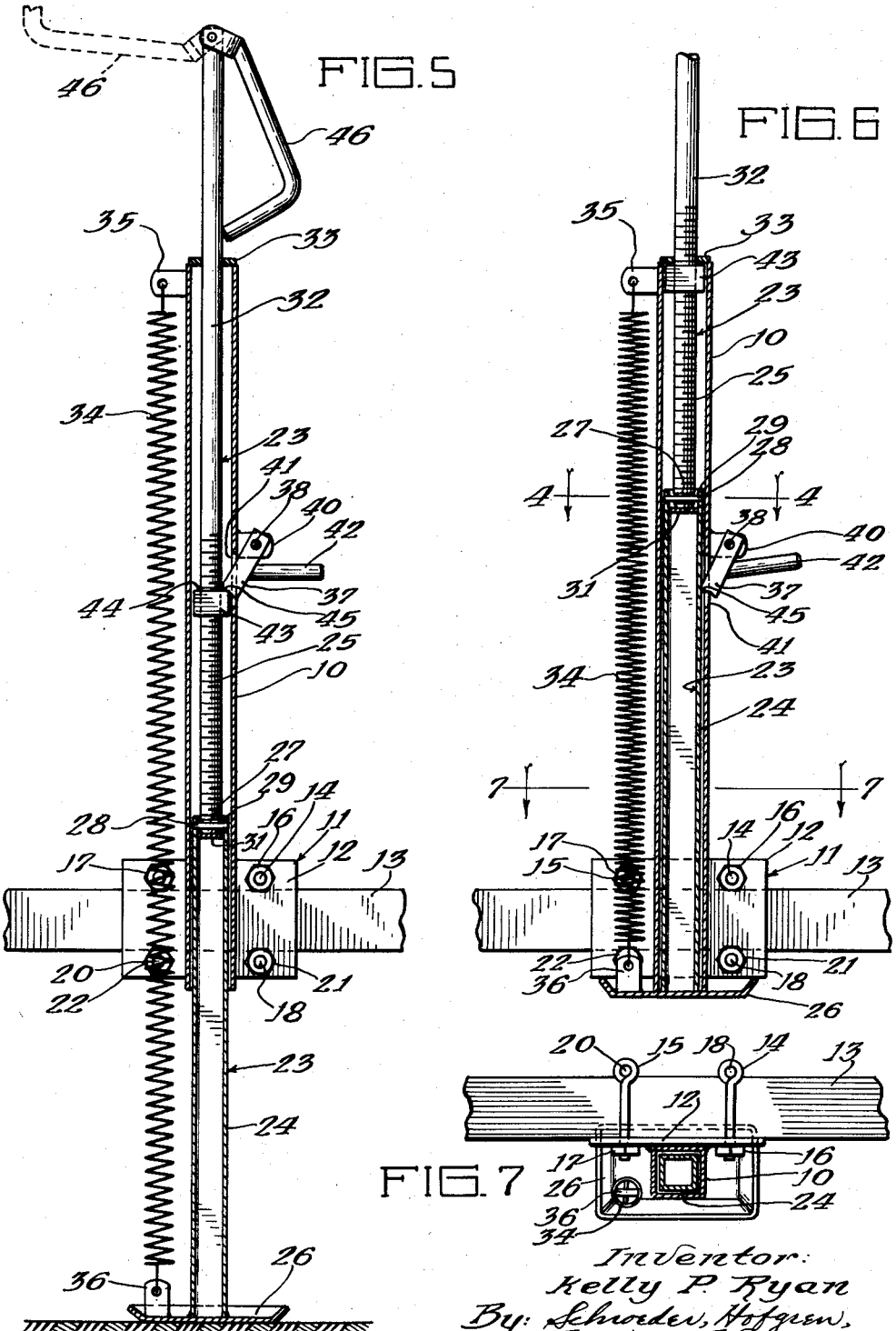

United States Patent Office 2,939,679
Patented June 7, 1960

2,939,679

TONGUE SUPPORTING JACK MECHANISM FOR TRAILER-TYPE VEHICLE

Kelly P. Ryan, 602 W. Front St., Blair, Nebr.

Filed Feb. 20, 1956, Ser. No. 566,592

7 Claims. (Cl. 254—86)

The present invention relates to a supporting mechanism, and more particularly to a jack mechanism for conveniently supporting the tongue of a trailer-type vehicle which is not in use.

Numerous kinds of trailing vehicles or devices are employed from time to time with a single tractor. Frequently the operator of the tractor must hitch or unhitch the trailing device by himself. In detaching a trailing device, there is usually a binding action in the tractor hitch, making it difficult for the tractor operator to maneuver the tractor and detach the trailing device at the same time.

It is contemplated that the jack mechanism of the present invention be secured to the tongue of each trailing device which is to be used with the tractor. The jack mechanism is normally carried in retracted inoperative position when the trailing device is hitched to the tractor, but it can be quickly and conveniently moved to supporting position by the tractor operator in order to detach the trailing device. When the trailing device is unhitched, the jack mechanism supports the tongue off the ground so that the trailing device can be readily rehitched by a single person at any time.

The primary object of the present invention is to provide a new and improved jack mechanism for supporting the tongue of a trailer-type vehicle.

Another object is to provide a jack mechanism which may be permanently attached to the tongue of a trailing vehicle, and which can be quickly and easily moved between retracted inoperative position and extended supporting position.

A further object is to provide a jack mechanism which is adapted for adjustment in small increments while in supporting position to facilitate hitching and unhitching a trailing vehicle.

Still another object is to provide a novel latch means which will automatically engage when the jack mechanism is in supporting position, and which will permit vertical adjustment of the jack mechanism in small increments.

The invention is illustrated in the preferred embodiment in the accompanying drawings, in which Fig. 1 is a side elevational view of the jack mechanism in its supporting position;

Fig. 2, an enlarged fragmentary top plan view;

Fig. 3, an enlarged fragmentary side elevational view taken from the right of Fig. 1 and showing the latching structure of the present invention;

Fig. 4, a sectional view taken as indicated on line 4—4 of Fig. 6;

Fig. 5, a side elevational view of the mechanism in supporting position with its tubular members in section to illustrate the internal structure of the device;

Fig. 6, a view as in Fig. 5, but with the device in retracted inoperative position; and Fig. 7, a sectional view taken as indicated on line 7—7 of Fig. 6.

In the embodiment illustrated, a housing member 10, preferably tubular and rectangular in cross section, may be provided with a bracket member, generally designated 11, near its lower end. The bracket member includes a bracket plate 12 welded to the housing member 10 and securing means for attaching the jack mechanism to a tongue 13 of a trailer-type vehicle, not shown.

As herein shown, the securing means includes a pair of upper eye-bolts 14 and 15 secured to the bracket plate 12 by a pair of nuts 16 and 17, and a lower pair of L-shaped members 18 and 20 secured to the bracket plate 12 by a pair of nuts 21 and 22. The free ends of each of the L-shaped members are adapted to pass through the openings in the eye-bolts, as shown in Fig. 7, and form with the eye-bolts a pair of U-shaped members which embrace the tongue 13. By rotatably advancing the nuts 16 and 17, 21 and 22, the bracket member 11 firmly secures the housing member 10 in upright position upon the tongue 13.

As best seen in Figs. 5 and 6, a supporting member, generally designated 23, is slidably received within the housing member 10. The supporting member 23 preferably includes a telescoping member 24 and a screw member 25. The telescoping member 24 is preferably tubular, and has a cross section similar to that the housing member 10 so as to make a close sliding fit within the housing member. The free end of the telescoping member 24 is provided with a broad base plate 26 for engaging the ground when the jack mechanism is in its supporting position. As seen in Fig. 6, the base plate also preferably rests against the housing member 10 and bracket member 11 to limit upward movement of the telescoping member 24 in its retracted, inoperative, carrying position.

The screw 25 of the supporting member 23 is preferably arranged to make a rotatable connection with the upper end 29 of the telescoping member 24. To this end, a thrust bearing or bearing plate 31 is preferably welded across the tubular telescoping member 24 within the upper end 29 to form a well-shaped receptable against which the lower end of the screw 25 may bear. The lower end of the screw 25 may be provided with an annular groove 27, and it is rotatably secured to the telescoping member 24 by a pair of similar pins 28 and 30 mounted in the upper end of the telescoping member 24. The pins 28 and 30 are adapted to fit in the annular groove 27, preferably on opposite sides of the screw 25, as shown in Fig. 4.

The upper end of the screw 25, which may include a shank portion 32, is slidably journaled in an apertured plate 33 welded across the upper end of the housing member 10. Thus, when the base plate 26 is depressed toward the ground, the entire supporting member 23, including the telescoping member 24 and the screw 25, will slide within the housing member 10. The supporting member 23 is preferably normally urged inward of the housing member 10 toward retracted inoperative position, illustrated in Fig. 6, and to this end, a tension spring 34 may be provided which is preferably secured at its opposite ends to a projection 35 on the housing 10 and to a projection 36 on the base plate 26.

Means are also provided for retaining the supporting member 23 in its extended supporting position, as shown in Fig. 5. In the present embodiment, a latch dog 37 is preferably pivoted by a pivot pin 38 between a pair of ears 40 welded to the housing 10. The latch dog 37 normally projects inwardly of the housing 10 through an elongated slot 41. Spring means may be provided normally to project the latch dog 37 inwardly of the housing 10; however, as herein shown, an outwardly projecting release lever 42 is secured to the latch dog 37, and it causes the pivoted latch dog 37 to swing inwardly through the slot 41 of the housing member 10 under the force of gravity, and to assume a balanced condition within the housing member 10.

A second latching member is provided on the supporting member 23 to cooperate with the latch dog 37 and hold the supporting member in extended position. As best seen in Figs. 5 and 6, a nut 43 is preferably threaded upon the screw 25. The nut 43 is preferably rectangular in cross section and is held against rotation by making a close sliding fit with the inner walls of the housing member 10.

When the telescoping member 24 is depressed, the nut 43 and the screw 25 move with it. As the nut 43 passes by the latch dog 37, it pivots the latch dog 37 outwardly of the housing member 10. When the nut 43 is moved farther downwardly, the latch dog 37 is cleared and is permitted to pivot inwardly of the housing member 10 again. The telescoping member 24 may then be released, and an upper face 44 of the nut 43 engages an angled edge 45 on the free end of the latch dog 37. Since the latch dog 37 is supported outwardly of the housing member 10 by the pin 38 and ears 40, this engagement tends to swing the latch dog 37 farther inwardly to securely latch the telescoping member in extended supporting position. Inward swinging of the latch dog 37 may be limited either by contact with the screw 25, or by contact between the latch dog 37 and a marginal edge portion of the slot 41.

To illustrate the operation of the jack mechanism, assume that the mechanism is secured to the tongue of a trailing device which is hitched to a tractor. At this time the jack mechanism will be in its retracted inoperative position, as shown in Fig. 6. When the operator of the tractor desires to detach the trailing device, he merely steps on a portion of the base plate 26 and depresses the telescoping member 24 a sufficient distance so that the nut 43 passes downwardly beyond the latch dog 37. The operator then removes his foot from the base plate 26, and the telescoping member 24 is retained in its extended supporting position.

A crank 46, which is pivotally secured to the shank 32 of the screw 25, may then be turned to rotatably advance the screw 25 through the nut 43 so that the screw bears against the thrust bearing 31 to depress the telescoping member 24, and the base plate 26 engages the ground. The crank may be rotated as desired to relieve any binding action that may be present between the trailer tongue and the tractor hitch, and the trailing device can easily be detached.

The tractor may then be pulled away, and the trailing device is permanently supported by the jack mechanism so that it may be conveniently rehitched to the tractor when desired. The jack mechanism retains the tongue hitch out of contact with the ground when the trailing device is not in use. In addition, should the base plate 26 sink into the ground after a period of time, it is a simple matter to realign the hitches of the tractor and trailer. The crank 46 may be turned to advance the screw 25 and telescoping member 24 in small increments until the desired alignment is obtained. When the tongue is attached once more to the tractor hitch, the release lever 42 may be pivoted counterclockwise, as shown in Figs. 5 and 6, to remove the angled edge 45 of the latch dog 37 from the upper face 44 of the nut 43. The supporting member 23 is then immediately moved to retracted inoperative position by the tension spring 34, and the trailing device is ready to be moved.

The foregoing detailed description is given for clearness of understanding only and no unnecessary limitations should be understood therefrom, for some modifications will be obvious to those skilled in the art.

I claim:

1. A jack for supporting the tongue of a trailer, comprising: a housing member adapted to be mounted on the tongue of a trailer; a telescoping member slidably mounted in said housing member and movable between a retracted inoperative position and an extended supporting position; an elongated screw secured to an end of said telescoping member, said screw being slidably journaled in the housing member for movement with the telescoping member; a latch member pivoted to said housing member and normally urged toward the screw; and a nut threaded on said screw, said nut being positioned to engage said latch member when the telescoping member is moved to extended position, the engagement of said nut and latch member retaining and supporting said telescoping member in extended position so that rotation of said screw will vary the extension of the telescoping member.

2. A jack as specified in claim 1, in which the screw is rotatably secured to the end of the telescoping member, said end being provided with a thrust bearing against which the screw bears when rotated to advance the telescoping member in extended position.

3. A jack as specified in claim 1, in which spring means are operatively connected to the telescoping member to urge said telescoping member toward retracted position.

4. A jack for supporting the tongue of a trailer, comprising: a tubular housing member of rectangular cross section having a longitudinally extending slot in its lateral surface, said housing member being adapted to be mounted in upright position on the tongue of a trailer; a telescoping member of similar cross section slidably received in the housing member and movable between a retracted inoperative position and an extended supporting position; an elongated screw rotatably secured to the upper end of said telescoping member, said screw being loosely journaled at its free end in the housing member to permit the screw and telescoping member to slide longitudinally of said housing member; a tension spring secured at its ends to the housing member and telescoping member to urge said telescoping member toward retracted position; a latch dog pivoted to the housing member, said latch dog being normally projected through the slot inwardly of said housing member; and a rectangularly-shaped nut threaded on the screw and held against rotation by making a close sliding fit with the inner walls of the housing member, said nut being movable with the screw to engaged position below the latch dog so that the upper face of said nut is held in engagement with said latch dog by the tension spring when the telescoping member is moved to extended position, the engagement of said nut and latch dog retaining the telescoping member in extended position whereby rotation of the screw will vary the extension of said telescoping member.

5. A jack for supporting the tongue of a trailer, comprising: a housing member adapted to be mounted on the tongue of a trailer; a supporting member slidably received in the housing member for movement between a retracted inoperative position and an extended supporting position, said supporting member including a ground engaging portion at one end and an elongated screw at the other end slidable in said housing member with the ground engaging portion; a latch member secured to the housing member adjacent a portion of said elongated screw when the supporting member is in extended position; and a nut threaded on said screw, said nut being of a size to engage said latch member when the supporting member is moved to extended position so that turning of the screw will move the nut relative to the screw and vary the extension of said supporting member with respect to the housing member.

6. A jack as specified in claim 5, in which the nut is slidable longitudinally with the elongated screw, and is held against rotation by the housing member when the screw is turned to vary the extension of the supporting member.

7. A jack as specified in claim 5 in which spring means are provided for normally urging the supporting member toward retracted position and for retaining said supporting member in retracted position when the latch member is disengaged from the nut.

References Cited in the file of this patent

UNITED STATES PATENTS

| | | |
|---|---|---|
| 161,974 | Marshall | Apr. 13, 1875 |
| 464,265 | Montgomery | Dec. 1, 1891 |
| 826,124 | Soseman | July 17, 1906 |
| 844,469 | Prouty | Feb. 19, 1907 |
| 2,084,941 | Capello | June 22, 1937 |
| 2,348,869 | Wagner | May 16, 1944 |